(12) United States Patent
Watarai

(10) Patent No.: US 7,573,299 B2
(45) Date of Patent: Aug. 11, 2009

(54) SEMICONDUCTOR INTEGRATED CIRCUIT INCLUDING OUTPUT CIRCUIT

(75) Inventor: Seiichi Watarai, Kanagawa (JP)

(73) Assignee: NEC Electronics Corporation, Kawasaki, Kanagawa (JP)

( * ) Notice: Subject to any disclaimer, the term of this patent is extended or adjusted under 35 U.S.C. 154(b) by 0 days.

(21) Appl. No.: 11/806,003

(22) Filed: May 29, 2007

(65) Prior Publication Data

US 2007/0279124 A1 Dec. 6, 2007

(30) Foreign Application Priority Data

May 31, 2006 (JP) ............................. 2006-150995

(51) Int. Cl.
*H03K 19/094* (2006.01)
(52) U.S. Cl. ...................... 326/83; 326/82; 327/560
(58) Field of Classification Search ............. 326/82–87, 326/115; 327/560
See application file for complete search history.

(56) References Cited

U.S. PATENT DOCUMENTS

| | | | | |
|---|---|---|---|---|
| 6,218,858 B1 * | 4/2001 | Menon et al. ................. 326/39 |
| 6,433,524 B1 * | 8/2002 | Yang et al. ................... 323/282 |
| 6,590,422 B1 * | 7/2003 | Dillon .......................... 326/86 |
| 6,847,232 B2 * | 1/2005 | Tinsley et al. ................. 326/84 |
| 6,933,743 B2 * | 8/2005 | Cecchi et al. ................. 326/16 |
| 7,126,378 B2 * | 10/2006 | Stojanovic et al. ............ 326/87 |
| 7,176,737 B2 * | 2/2007 | Baker et al. ................. 327/280 |
| 7,183,805 B2 * | 2/2007 | Wang et al. .................. 326/86 |
| 7,227,488 B2 * | 6/2007 | Cho ........................... 341/155 |
| 2005/0067969 A1 * | 3/2005 | Maede et al. ............ 315/169.1 |

FOREIGN PATENT DOCUMENTS

JP 2003-152522 5/2003

* cited by examiner

*Primary Examiner*—Rexford N Barnie
*Assistant Examiner*—Crystal L Hammond
(74) *Attorney, Agent, or Firm*—McGinn IP Law Group, PLLC

(57) ABSTRACT

An output circuit includes a differential section configured to amplify an inputted differential signal; a current source section configured to supply a current to the differential section; a load resistance section connected with the differential section; and a control unit configured to set a value of the current from the current source section and a resistance value of the load resistance section based on a signal supplied to the control unit. The output circuit converts the differential signal into an output signal of a different interface level from that of the differential signal and balance-transmits the output signal.

2 Claims, 10 Drawing Sheets

Fig. 4 PRIOR ART

| VDD [V] | Symbol [mV] | PECL spec min | PECL spec max | LVDS spec min | LVDS spec max | PCI-express spec min | PCI-express spec max | XAUI spec min | XAUI spec max |
|---|---|---|---|---|---|---|---|---|---|
| 3.0 | VOH | 1975 | 2120 | 1250 | 1475 | - | - | - | - |
|  | VOL | 1190 | 1380 | 925 | 1150 | - | - | - | - |
|  | VOD | 595 | 930 | 250 | 400 | 400 | 600 | 400 | 800 |
|  | VCM | - | - | 1125 | 1275 | - | - | - | - |
| 3.6 | VOH | 2575 | 2720 | same as above | | same as above | | same as above | |
|  | VOL | 1790 | 1980 |  |  |  |  |  |  |
|  | VOD | 595 | 930 |  |  |  |  |  |  |
|  | VCM | - | - |  |  |  |  |  |  |
| Interface Coupling | | DC | | DC | | AC | | AC | |

Fig. 5 PRIOR ART

| Driver Type | Specification | | | | |
|---|---|---|---|---|---|
| | PECL | | LVDS | | PCI-e/XAUI |
| | VOD | VOL/H | VOD | VCM | VOD |
| CONVENTIONAL PECL | ○ | ○ | ○ | × | ○ |
| CONVENTIONAL LVDS | ○ | × | ○ | ○ | ○ |
| CONVENTIONAL PCI-e/XAUI | ○ | × | ○ | × | ○ |
| DRIVER IN INVENTION | ○ | ○ | ○ | ○ | ○ |

SEMICONDUCTOR INTEGRATED CIRCUIT INCLUDING OUTPUT CIRCUIT

BACKGROUND OF THE INVENTION

1. Field of the Invention

The present invention relates to a semiconductor integrated circuit having an output circuit for outputting a balanced signal.

2. Description of the Related Art

An output level of an output circuit for transmitting a signal from an integrated circuit to another integrated circuit is previously defined according to a standard. General examples include PECL (Pseudo-Emitter Coupled Logic), and LADS (Low Voltage Differential Signaling), and recently, PCI-express (Peripheral Component Interconnect-), XAUI (10 Gigabit Attachment Unit Interface), Infini Band, and Serial-ATA. FIG. 4 shows specification of typical interface levels. As apparent from FIG. 4, these interface levels are not compatible with each other. For example, comparing the specification of the PECL interface level with that of the LVDS interface level in FIG. 4, the output level (VOH, VOL) of PECL is a voltage lowered from a power supply voltage by a certain value, while the output level (VOH, VOL) of LVDS is a voltage which is independent of variation in the power supply voltage.

Accordingly, the output circuit is generally configured according to a distinct circuit format suitable for the interface level of each standard. Each of these interfaces has a characteristic which cannot be achieved by other interfaces such as low power consumption. Thus, to use different interfaces for different purposes, there are many system devices having different interface levels with the similar function. As a result, transmission and reception between different interface levels is required. Such examples include an electrical input/output interface of an optical transmitter module.

Generally, the PECL or LVDS interface has become the mainstream of the electrical input/output interface of an optical transmitter module and is widely used in ASSP (Application Specific Standard Product) in many ways. In order to convert a signal into the interface level between PECL and LVDS as DC-coupled interfaces, the level using an external termination resistance is generally used. Hereinafter, an example is shown.

FIG. 1 shows a circuit configuration of a typical example of a level converting method. In FIG. 1, an output of an output circuit 40 in the LVDS interface is converted into the PECL interface level and outputted to a receiver 50. The LVDS interface output circuit 40 has N channel transistors 41 and 42 as a differential pair, a current source 43, load resistances 46 and 47 having a resistance value RL and a level controller 48. A differential signal (INA, INB) is supplied to gates of the N channel transistors 41 and 42 of the differential pair and a signal of LVDS level as shown in FIG. 4 is output from the output terminals OUTA and OUTB.

The output of the output circuit 40 is converted into the PECL interface level by a level converting circuit having resistances 51 to 53, and 55 to 57, and supplied to the receiver 50. The resistance 51 having a resistance value R1, the resistance 52 having a resistance value R2 and the resistance 53 having a resistance value R3 are serially connected between a power supply voltage VDD2 and a ground GND. The output terminal OUTB is connected to a connection node of the resistance 52 and the resistance 53. A signal of the PECL level is outputted from a connection node ROUTB of the resistance 51 and the resistance 52. Symmetrically, the resistance 55 having the resistance value R1, the resistance 56 having the resistance value R2 and the resistance 57 having the resistance value R3 are serially connected between the power supply voltage VDD2 and the ground GND. The output terminal OUTA is connected to a connection node of the resistance 56 and the resistance 57. A signal of the PECL level is outputted from a connection node ROUTA of the resistance 55 and the resistance 56.

Given that the "H" level output voltage of the output nodes ROUTA and ROUTB is VOH, the "L" level output voltage of the output nodes ROUTA and ROUTB is VOL and amplitude, that is, differential output voltage of the output signal is VOD, each of the voltages can be obtained according to the following equations (1-1) to (1-3). With the power supply voltage VDD, VDD1=VDD2=VDD.

$$VOH = VDD \times (R2+R3)/(R1+R2+R3) + RL \times I1 \times R1/\{2 \times (R1+R2)\} \quad (1\text{-}1)$$

$$VOL = VDD \times (R2+R3)/(R1+R2+R3) - RL \times I1 \times R1/\{2 \times (R1+R2)\} \quad (1\text{-}2)$$

$$VOD = RL \times I1 \times R1/(R1+R2) \quad (1\text{-}3)$$

By properly selecting the resistances 51 to 53, 55 to 57, the level can be converted to correspond to the PECL interface to some extent. However, as understood from FIG. 4, the signal of the LVDS interface is a signal having a common voltage of 1.2 V and a fixed voltage independently from the power supply voltage. On the contrary, the signal of the PECL interface is a signal having a relative voltage which varies in level in connection with the power supply voltage. In the resistance-dividing level converting circuit in FIG. 1, as represented by Equations (1-1) and (1-2), the output voltages VOH and VOL vary according to a resistance division ratio of the power supply voltage VDD. Thus, the output voltages VOH and VOL satisfy the amplitude standard (VOD) of the PECL interface, but cannot satisfy the standard of the output level (VOH, VOL) unless the resistance values R1, R2 and R3 are changed depending on the power supply voltage VDD.

FIG. 2 shows an example of a circuit for converting the PECL interface into the LVDS interface. An output circuit 60 of the PECL interface has transistors 61 and 62 as a differential pair, a current source 63, output transistors 65 and 66 and load resistances 67 and 68. A differential signal (INA, INB) is supplied to bases of transistors 61 and 62 and the signal of the PECL level in FIG. 4 is output from the output terminals OUTA and OUTB.

The output of the output circuit 60 is converted into the output of the LVDS level by a level converting circuit having resistances 71, 72, 74 and 75 and the converted output is supplied to a receiver 70. The resistance 71 having a resistance value R1 and the resistance 72 having a resistance value R2 are serially connected between the output terminal OUTA and the ground GND. The signal of the LVDS level is outputted from a connection node ROUTA of the resistance 71 and the resistance 72. Symmetrically, the resistance 74 having the resistance value R1 and the resistance 75 having the resistance value R2 are serially connected between the output terminal OUTB and the ground GND. The signal of the LVDS level is outputted from a connection node ROUTB of the resistance 74 and the resistance 75.

Given that a common voltage of balanced signals outputted from the output nodes ROUTA and ROUTB is VCM and an amplitude, that is, differential output voltage of the output signal is VOD, each of the voltages can be obtained according to the following equations (2-1) and (2-2):

$$VCM = (VCC1 - RL \times I1/2 - VF) \times R2/(R1+R2) \quad (2\text{-}1)$$

$$VOD = RL \times I1 \times R2/(R1+R2) \quad (2\text{-}2)$$

Here, VF is a base-emitter voltage of the transistors 65 and 66. In this example, a conversion reverse to the level conversion described referring to FIG. 1 is performed. By properly selecting the resistance values R1 and R2 according to equation (2-2), LVDS amplitude standard (VOD) can be satisfied. However, as represented by the equation (2-1), in accordance with change in the power supply voltage VCC1, the output common voltage VCM varies depending on the resistance division ratio. Thus, the level converting circuit cannot satisfy the standard of the output common voltage VCM unless the resistance values R1 and R2 changes in accordance with the change in the power supply voltage VCC1.

Some interfaces do not use any external termination resistance. For example, as shown in FIG. 3, a typical example is a PCI-express interface. An output circuit 80 of the PCI-express interface has N channel transistors 81 and 82 as a differential pair, a current source 83 and load resistances 86, 87 and 88. A differential signal (INA, INB) is supplied to gates of the N channel transistors 81 and 82 and a signal of the PCI-express interface level is output from a connection node (OUTA, OUTB) of drains of the N channel transistors 81 and 82 and the load resistances 86 and 87, respectively. Outputs of the output circuit 80 are terminated by the termination resistance 91 having a resistance value RE and supplied to a receiver 90.

The PCI-express interface standard defines only output amplitude (VOD). When the output circuit 80 is used for the receiver 90 of the PECL interface, the resistance 88 having a resistance value RD may be adjusted to correspond to the "H" level output voltage VOH and the "L" level output voltage VOL of the PECL interface. The output levels VOH and VOL of the output terminals OUTA and OUTB and the amplitude VOD can be obtained according to the following equations (3-1) to (3-3):

$$VOH = VDD1 - \{RL \times RL/(2 \times RL + RE) + RD\} \times I1 \quad (3\text{-}1)$$

$$VOL = VDD1 - \{RL \times (RL + RE)/(2 \times RL + RE) + RD\} \times I1 \quad (3\text{-}2)$$

$$VOD = I1 \times RL \times RE/(2 \times RL + RE) \quad (3\text{-}3)$$

The equation (3-3) has a solution which satisfies the amplitude standard (VOD) of the PECL interface and the LVDS interface independently from the power supply voltage. As represented by the equation (3-1) and the equation (3-2), the output levels VOH and VOL of the output terminals OUTA and OUTB are determined based on the resistances 86 to 88 of the output circuit 80 and the terminal resistance 91 (resistance value RE) of the receiver 90. When the resistances 86 to 88 of the output circuit 80 are manufactured in the semiconductor integrated circuit together with the transistors and the like, the resistance values of the resistances have relatively a large manufacturing variation. Generally, it has been said that the resistance value of the resistance in the semiconductor integrated circuit has manufacturing variation of about −20% to +20%. Accordingly, when there is a mismatch between the above-mentioned resistance value and the resistance value of the termination resistance 91 on the receiving side, standards of the PECL interface, output levels VOH and VOL of the LVDS interface and the common voltage VCM cannot be satisfied. For example, to satisfy the standard of the output levels VOH and VOL of the PECL interface, the manufacturing variation of the resistance value needs to fall between −10% and +10%. Thus, it is difficult that the output circuit using the PCI-express interface satisfies the standard of the output levels VOH and VOL of the PECL or LVDS interface, or the standard of the common voltage VCM.

As described above, a load resistance (resistance value RL) in the output circuit and a current source (current value I1) have conflicting characteristics in variables (variation). For example, when the resistance value RL of the load resistance increases by 1.2 times due to the manufacturing variation, the current value I1 of the current source decreases by $1/1.2$ times conversely. Accordingly, when the differential output terminals (OUTA and OUTB) are in the opened state, that is, nothing is connected to the output terminals, amplitude generated by the load resistance and the current source is kept constant in both the above-mentioned case.

However, the output level standard of the PECL interface is linked to the power supply voltage and the output level standard of the LVDS interface is fixed with respect to the ground voltage, which have conflicting characteristics. When the level of the output of such an output circuit is converted by a level shift circuit having an external resistance inserted between the current source and the ground, the output level is determined with respect to the power supply voltage depending on the resistance division ratio. For this reason, the standard cannot be satisfied unless the resistance value is adjusted for each interface and each power supply voltage according to use environment.

When a resistance built in the semiconductor integrated circuit is used as the load resistance of the output circuit, the resistance value greatly varies due to manufacturing variation. The output level of the output circuit is determined depending on a deviation ratio of the load resistance and a terminating resistance on the receiving side. For this reason, when the load resistance varies due to manufacturing variation and does not match the value of the terminating resistance on the receiving side, the standard of the interface cannot be satisfied. Especially in the PECL interface having a narrow allowable range of the output level, it is difficult to satisfy the standard.

FIG. 5 summarizes compatibility of level conversion in the above-mentioned typical conventional output circuit. In FIG. 5, a circle represents availability including realization through level shift by the external resistance or the like or switching of current flow.

Japanese Laid Open Patent Publication (JP-P2003-152522A) discloses a circuit for switching between PECL and LVDS, as a method which does not use the above-mentioned level conversion. An output circuit disclosed in Japanese Laid Open Patent Publication (JP-P2003-152522A) has a first output block including a first output port and a second output block including a second output port. The first and second output blocks are configured match a first transmission mode according to a first external control signal and bring about a first output characteristic in the first and second output ports. The first and second output blocks are configured match a second transmission mode according to a second external control signal and bring about a second output characteristic in the first and second output ports. The first transmission mode is a positive ECL (PECL) standard and the second transmission mode is a low-voltage differential signal transmission (LVDS) standard. Each of the first and second output blocks includes a switchable current source for feeding a current selected from a plurality of predetermined currents in the respective port according to the selected external control signal.

SUMMARY

The present invention provides a semiconductor integrated circuit including an output circuit which can output a signal of a level conforming to each standard.

In one embodiment of the present invention, an output circuit includes a differential section configured to amplify an inputted differential signal; a current source section configured to supply a current to the differential section; a load resistance section connected with the differential section; and a control unit configured to set a value of the current from the current source section and a resistance value of the load resistance section based on a signal supplied to the control unit. The output circuit converts the differential signal into an output signal of a different interface level from that of the differential signal and balance-transmits the output signal.

In this way, the present invention provides an output circuit and a semiconductor integrated circuit which can output signals of difference interface levels. For interfaces having different output levels such as LVPECL and LVDS used generally as well as high-speed serial interfaces such as PCI-express and XAUI used recently, the level conforming to each standard can be outputted.

BRIEF DESCRIPTION OF THE DRAWINGS

The above and other objects, advantages and features of the present invention will be more apparent from the following description of certain preferred embodiments taken in conjunction with the accompanying drawings, in which:

FIG. 4 is a diagram showing specification of typical interfaces;

FIG. 5 is a diagram showing comparability of each interface circuit;

DETAILED DESCRIPTION OF THE PREFERRED EMBODIMENTS

Hereinafter, an output circuit of the present invention will be described in detail with reference to the attached drawings.

Figure 1:
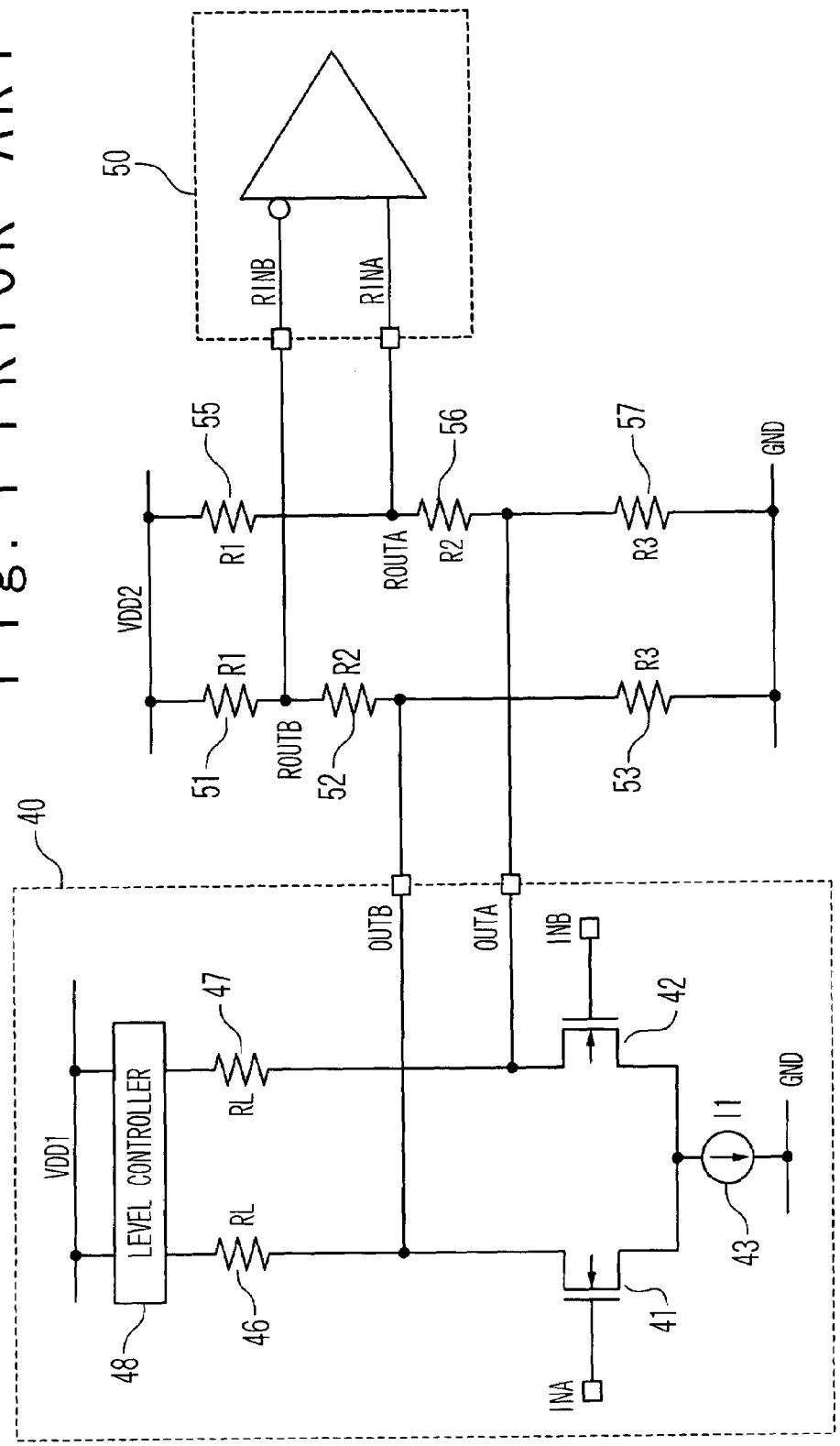
FIG. 1 is a circuit diagram showing a conventional level converting circuit (LVDS-PECL)
Figure 2:
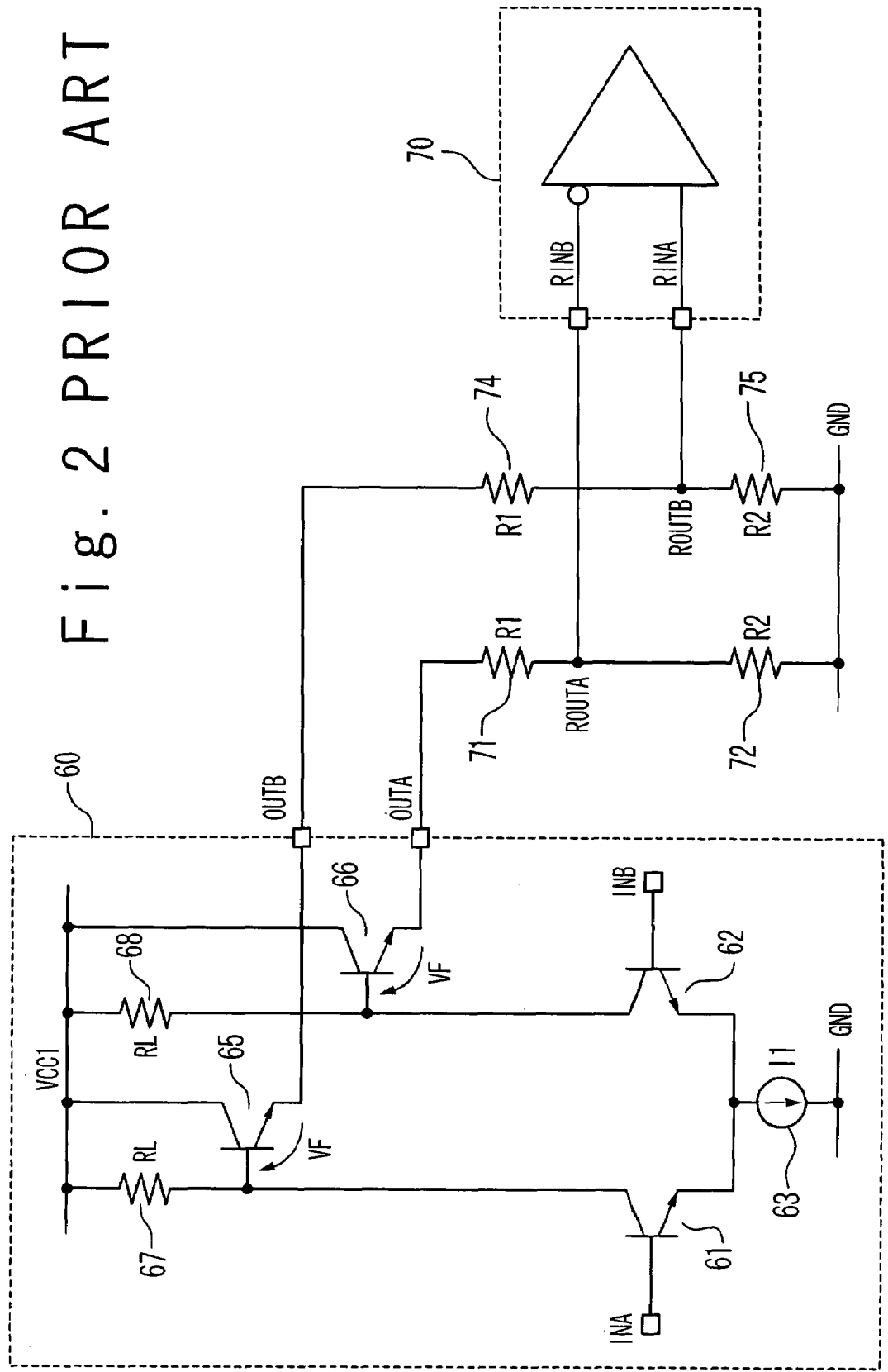
FIG. 2 is a circuit diagram showing a conventional level converting circuit (PECL-LVDS)
Figure 3:
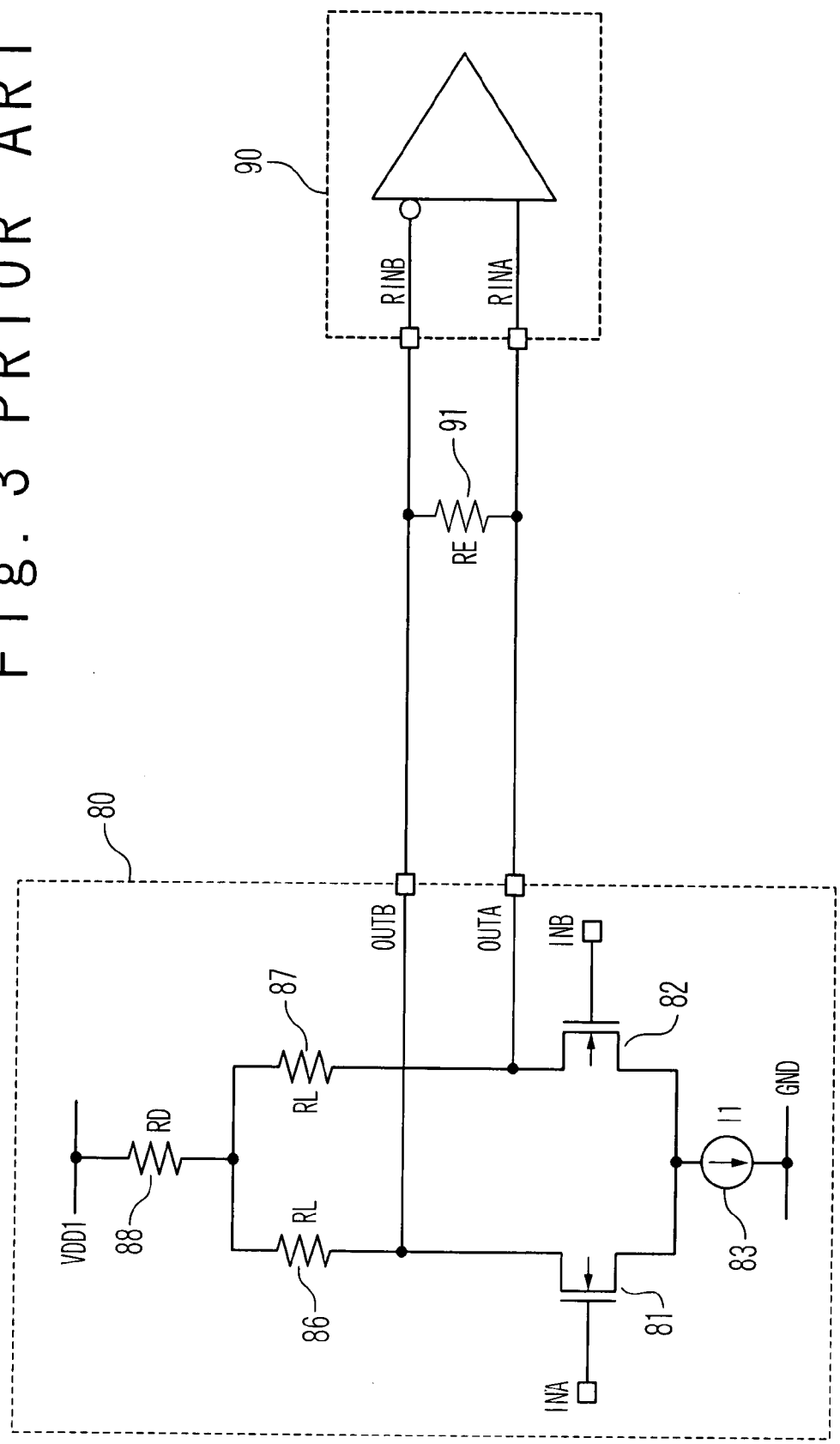
FIG. 3 is a circuit diagram showing an interface which does not use an external termination resistance.
Figure 6:
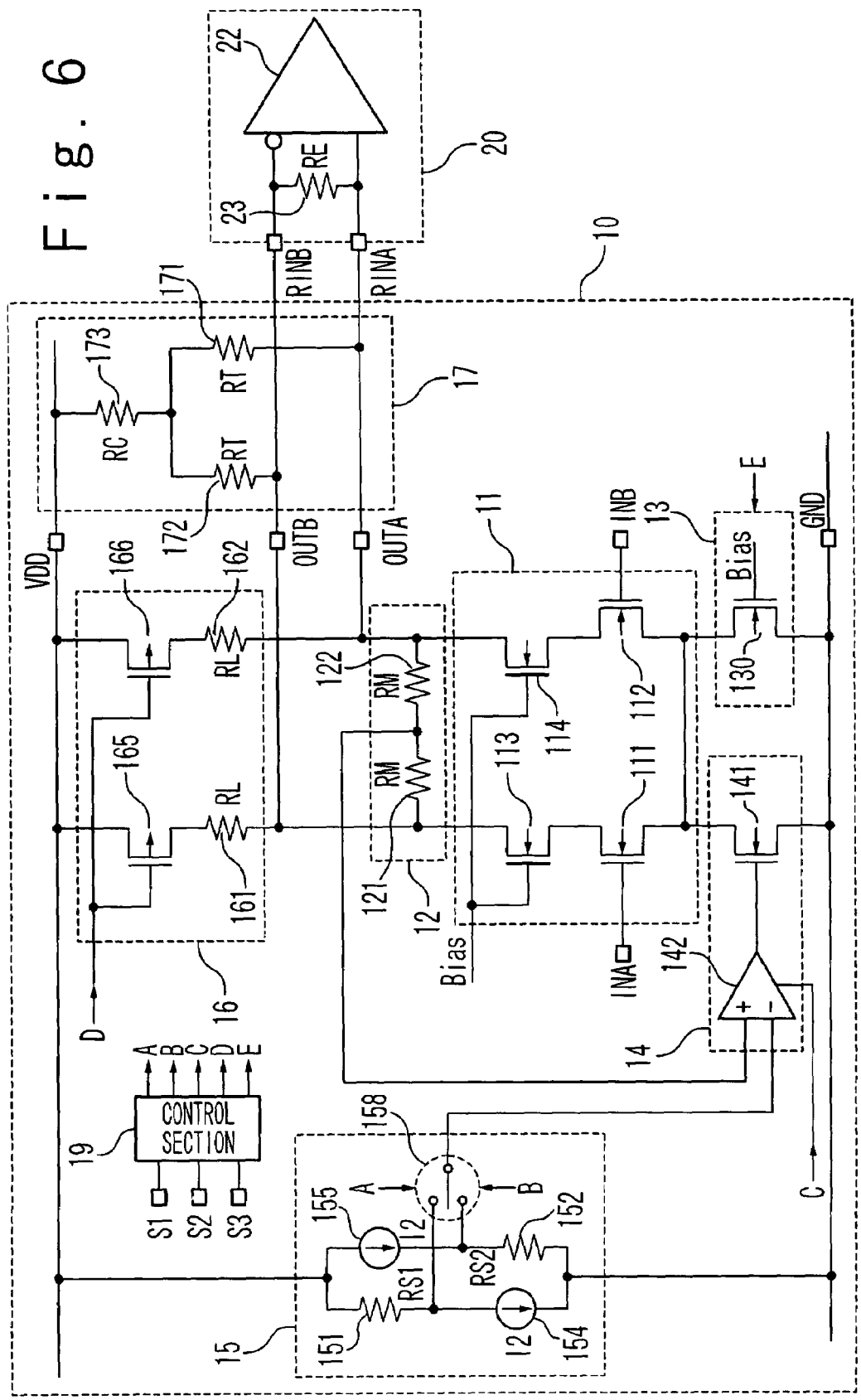
FIG. 6 is a circuit diagram of an output circuit according to an embodiment of the present invention.

FIG. 6 is a circuit diagram showing a configuration of the output circuit according to an embodiment of the present invention. Referring to FIG. 6, the output circuit 10 of the present invention has a differential output section 11, a level detecting section 12, a current source section including a reference current source section 13 and a current correcting section 14, a level generating section 15, a resistance section including an internal resistance section 16 and an external resistance section 17, and a control section 19. A receiving section 20 is exemplified as a circuit of the receiving side. The receiving section 20 has a receiving circuit 22 and a terminal resistance 23 and receives a signal output from the output circuit 10. A resistance value RE of the terminal resistance 23 is generally 100Ω.

The differential output section 11 has N channel transistors 111 and 112 as a differential pair and N channel transistors 113 and 114 respectively cascade-connected to the N channel transistors 111 and 112. The N channel transistors 113 and 114 have gate oxide films thicker than those of the N channel transistors 111 and 112. A fixed bias voltage is supplied to gates of the N channel transistors 113 and 114 to compensate breakdown voltages of the N channel transistors 111 and 112 of the differential pair. When there is no problem in the breakdown voltages of the N channel transistors 111 and 112, the N channel transistors 113 and 114 may be omitted. Signals of a differential input signal (INA-INB) are supplied to the gates of the N channel transistors 111 and 112. Sources of the N channel transistors 111 and 112 are connected to each other and connected to the reference current source section 13 and the current correcting section 14 as the current source section.

The current source section has the reference current source section 13 and the current correcting section 14 and controls currents flowing to the N channel transistors 111 and 112. The reference current source section 13 controls the currents steadily flowing to the N channel transistors 111 and 112 as the differential pair. In FIG. 6, a reference current is supplied by applying an appropriate fixed bias voltage E to the N channel transistor 130. However, as shown in FIG. 7, the reference current may be supplied from a plurality of current sources.

Figure 7:
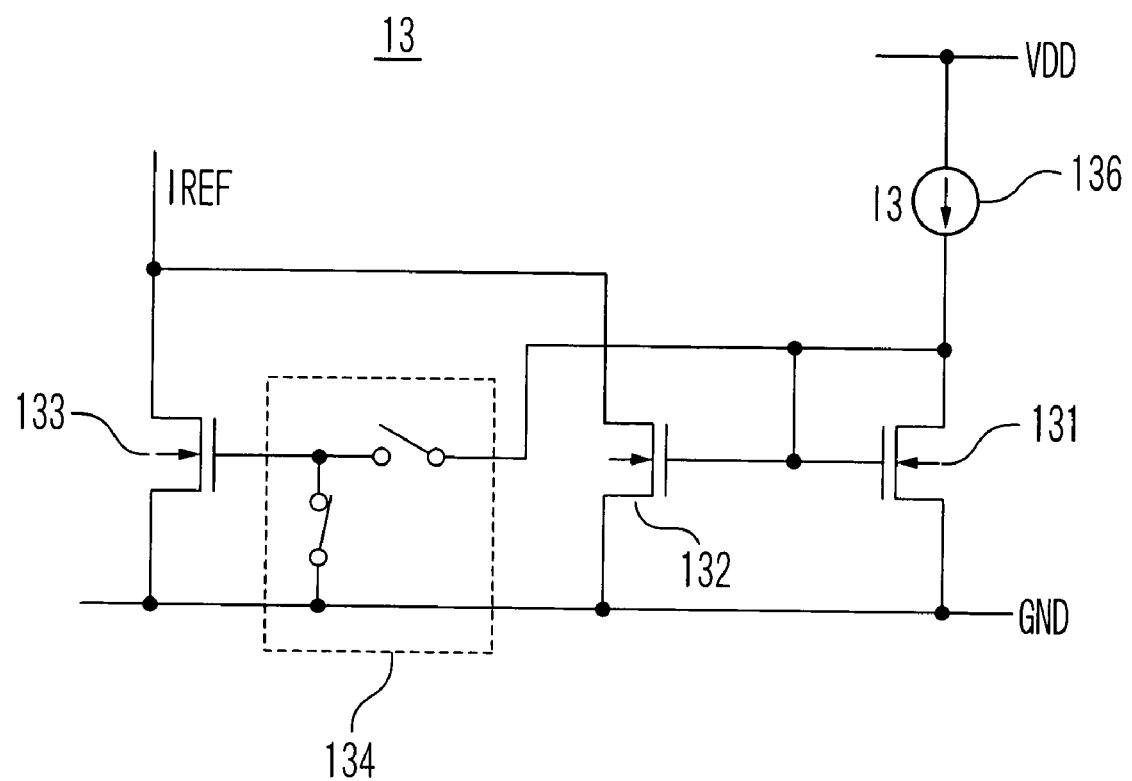
FIG. 7 is a circuit diagram showing a reference current source section in the output circuit according to the embodiment of the present invention.

In FIG. 7, the reference current source section 13 has a current source 136, N channel transistors 131, 132 and 133 and a switch circuit 134. The N channel transistors 131, 132 and 133 function as a current mirror circuit, and a current is controlled by the switch circuit 134 by using as reference a current supplied from the current source 136. For example, when the N channel transistors 131, 132 and 133 have the same characteristic, and the N channel transistor 133 is set to an ON state by the switch circuit 134, a current of a same value as a current flowing through the N channel transistor 131 flows through the N channel transistors 132 and 133. Thus, the reference current source section 13 flows twice as much current as the current supplied from the current source 136. When the N channel transistor 133 is set to an OFF state by the switch circuit 134, the current of the same value as the current flowing through the N channel transistor 131 flows through the N channel transistors 132. Thus, the reference current source section 13 supplies the current of the same value as the current supplied from the current source 136. The current supplied from the reference current source section 13 can be set by adding transistors or adjusting characteristic of the transistors so as to adapt to various interfaces.

The current correcting section 14 has an N channel transistor 141 and a level determining circuit 142 including a differential amplifier. The level determining circuit 142 compares the level of an output signal detected by the level detecting section 12 with a desired reference output level of an interface signal generated by the level generating section 15 and controls a current flowing through the N channel transistor 141. Thus, the level of the output signal is controlled to be equal to a reference output level generated by the level generating section 15. The current correcting section 14 is disabled based on a control by the control section 19.

The level detecting section 12 has resistances 121 and 122 having a resistance value RM. The resistances 121 and 122 are serially connected between output terminals OUTA and OUTB. An output of the level detecting section 12 is obtained from a connection node of the resistance 121 and the resistance 122. That is, the level detecting section 12 outputs an intermediate level of the output signal. The resistances having the resistance value RM of a few tens of Kohm are used as the resistances 121 and 122 of the level detecting section 12.

The level generating section 15 has current sources 154 and 155 having a current value I2, a resistance 151 having a resistance value RS1, a resistance 152 having a resistance value RS2 and a switch circuit 158. The resistance 151 and the current source 154 are serially connected between a power supply voltage VDD and a ground GND. A voltage lower than the power supply voltage VDD by a certain value is taken from a connection node of the resistance 151 and the current source 154 as the output level of a PECL interface. The current source 155 and the resistance 152 are serially connected between the power supply voltage VDD and the ground GND. A voltage higher than GND by a certain value is taken from a connection node of the current source 155 and the resistance 152 as the LVDS output level. The switch circuit 158 switches to select one of these generated voltages on the basis of control by the control section 19 and supplies the selected voltage to the current correcting section 14.

The resistance section includes the internal resistance section 16 and the external resistance section 17. The internal resistance section 16 has resistances 161 and 162 having a resistance value RL and P channel transistors 165 and 166. The resistance 161 is inserted between the output terminals OUTB and the power supply voltage VDD and connection between the resistance 161 and the power supply voltage VDD is controlled by the P channel transistor 165. The resistance 162 is inserted between the output terminals OUTA and the power supply voltage VDD and connection between the resistance 162 and the power supply voltage VDD is controlled by the P channel transistors 166. The P channel transistors 165 and 166 connect or disconnect the resistances 161 and 162 to or from the power supply voltage VDD on the basis of control by the control section 19. The external resistance section 17 has resistances 171 and 172 having a resistance value RT (generally, 50 ohm) and a resistance 173 having a resistance value RC. The resistances 171 and 172 are serially connected between the output terminals OUTA and OUTB. The resistance 173 is inserted between a connection node of the resistance 171 and the resistance 172 and the power supply voltage VDD. When the accuracy of the resistance value of a termination resistance of the internal resistance section 16 is low or a flowing current value is large, the external resistance section 17 is provided outside of the semiconductor integrated circuit. Therefore, the external resistance section 17 can be provided only when the external resistance needs to be provided.

The control section 19 generates control signals based on the level of the voltage applied to external terminals S1 to S3 to control each section. Signals for designating properties of an interface to be output from the output circuit 10 are applied to the external terminals S1 to S3. That is, the control section 19 controls a value of a current flowed from the reference current source section 13 and controls whether or not the current is to be corrected by the current correcting section 14. The control section 19 selects one of a plurality of reference levels generated by the level generating section 15 and supplies the selected one to the current correcting section 14 or stops the supply. Furthermore, the control section 19 controls whether or not the internal resistance section 16 is used.

Figure 8:
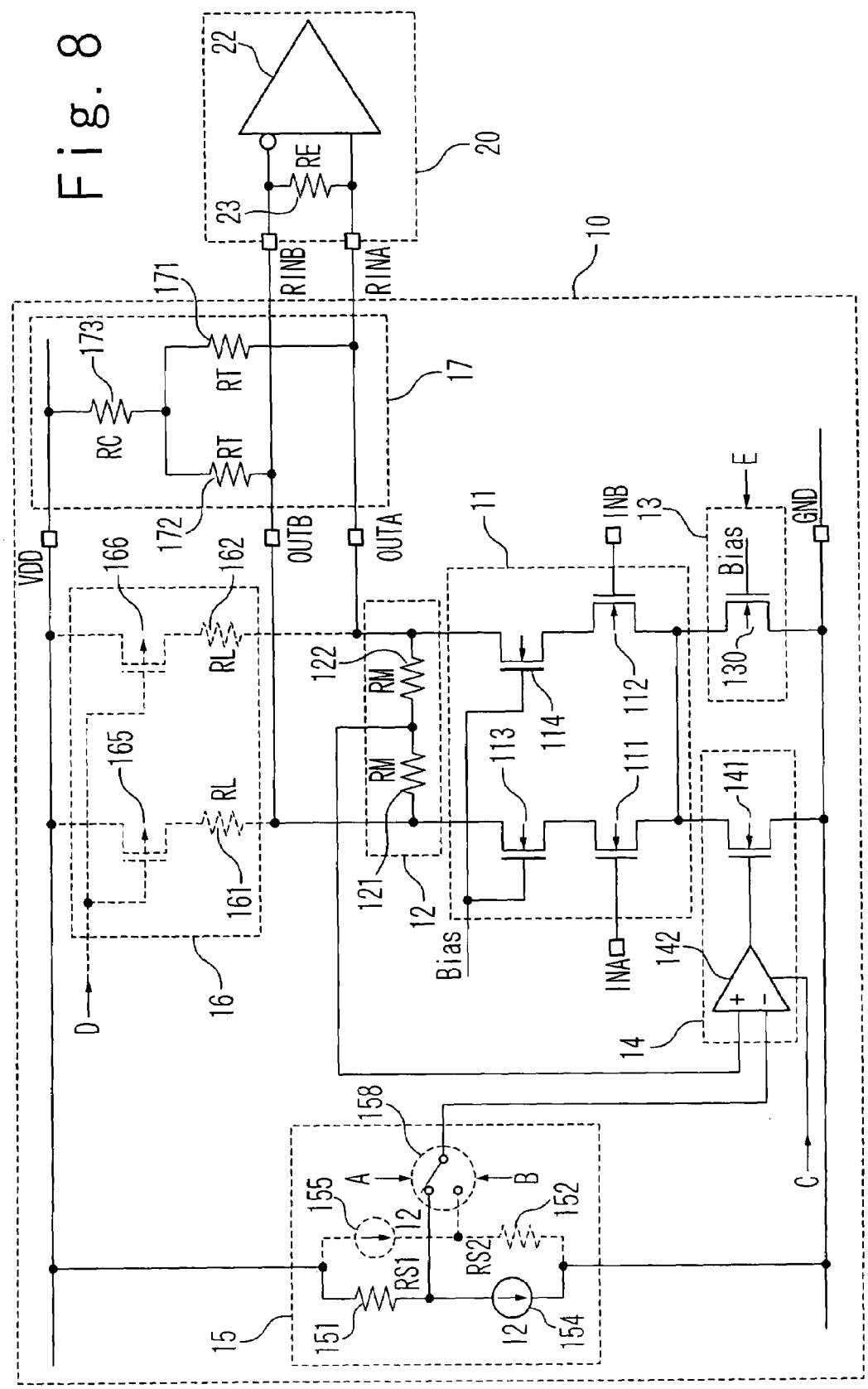
FIG. 8 is a circuit diagram showing an operation of the output circuit (PECL) according to the embodiment of the present invention.

Next, an operation of the output circuit 10 will be described. First, a case where the output circuit 10 outputs a signal of the PECL interface will be described referring to FIG. 8. The voltage signals are applied to the external terminals S1 to S3 of the output circuit 10 to select the PECL interface. Thus, when the output circuit operates as the PECL interface output circuit, a circuit portion unrelated to the operation is represented by broken lines (a control circuit 19 and the external terminals S1 to S3 are not shown), as shown in FIG. 8. The control circuit 19 set the internal resistance section 16 to an opened state and uses the external resistance section 17 as the load resistance. Furthermore, the control circuit 19 controls the switch circuit 158 of the level generating section 15 to select a voltage of a connection node of the resistance 151 and the current source 154 and supplies the selected voltage to the current correcting section 14. That is, the level generating section 15 generates a voltage lower than the power supply voltage VDD indicating the output level of the PECL interface by a predetermined voltage and outputs the generated voltage.

The output levels of the PECL interface outputted from the output terminals OUTA and OUTB are adjusted by use of the resistance 173. In this circuit, the resistance value RC of the resistance 173 is calculated according to the following equation (4-1).

$$RC = RT \times RE \times \{VDD - (VOH + VOL)/2 - VOD\} / \{(2 \times RT + RE) \times VOD\} \quad (4\text{-}1)$$

Thus, by substituting center values of VOH, VOL, VOD of the PECL interface standard for the voltages VOH, VOL, VOD and also substituting center values of the power supply voltage applied to the output circuit 10 as the power supply voltage VDD into the equation (4-1), the resistance value RC can be obtained. A center value of the resistance used for normal impedance matching is substituted for the resistance value RT and the resistance value RE.

Given that a current value of the current supplied from the current source section is I, that is, when the reference current source section 13 and the current correcting section 14 flow a current having the current value I, the output levels VOH and VOL and amplitude VOD are calculated according to the following equations (4-2), (4-3) and (4-4).

$$VOH = VDD - \{RT \times RT/(2 \times RT + RE) + RC\} \times I \quad (4\text{-}2)$$

$$VOL = VDD - \{RT \times (RT + RE)/(2 \times RT + RE) + RC\} \times I \quad (4\text{-}3)$$

$$VOD = I \times RT \times RE/(2 \times RT + RE) \quad (4\text{-}4)$$

As understood by the above-mentioned equations, since the reference current source section 13 flows a current of a fixed value, the output levels VOH, VOL and the amplitude VOD can be controlled by controlling a value of the current supplied from the current source section by the current correcting section 14. In other words, the current correcting section 14 corrects a current supplied from the current source section by the N channel transistor 141 so that a voltage value detected by the level detecting section 12, that is, the voltage value at the connection node of the resistance 121 and the resistance 122 is equal to the voltage value outputted by the level generating section 15. Thereby, the output levels VOH and VOL and the amplitude VOD become equal to a signal level of the PECL interface on the basis of the reference level generated by the level generating section 15. Thus, through the above-mentioned setting and correcting operation of the resistance value and the voltage value, the output circuit 10 can output the signal having the output level of the PCEL interface.

It should be noted that the resistance value RC of the resistance 173 is preferably set to 18 ohm for satisfying the output level of the PECL interface in FIG. 4 in the configuration of the output circuit 10. This resistance value is a resistance value designated for generally used E24 series.

Figure 9:
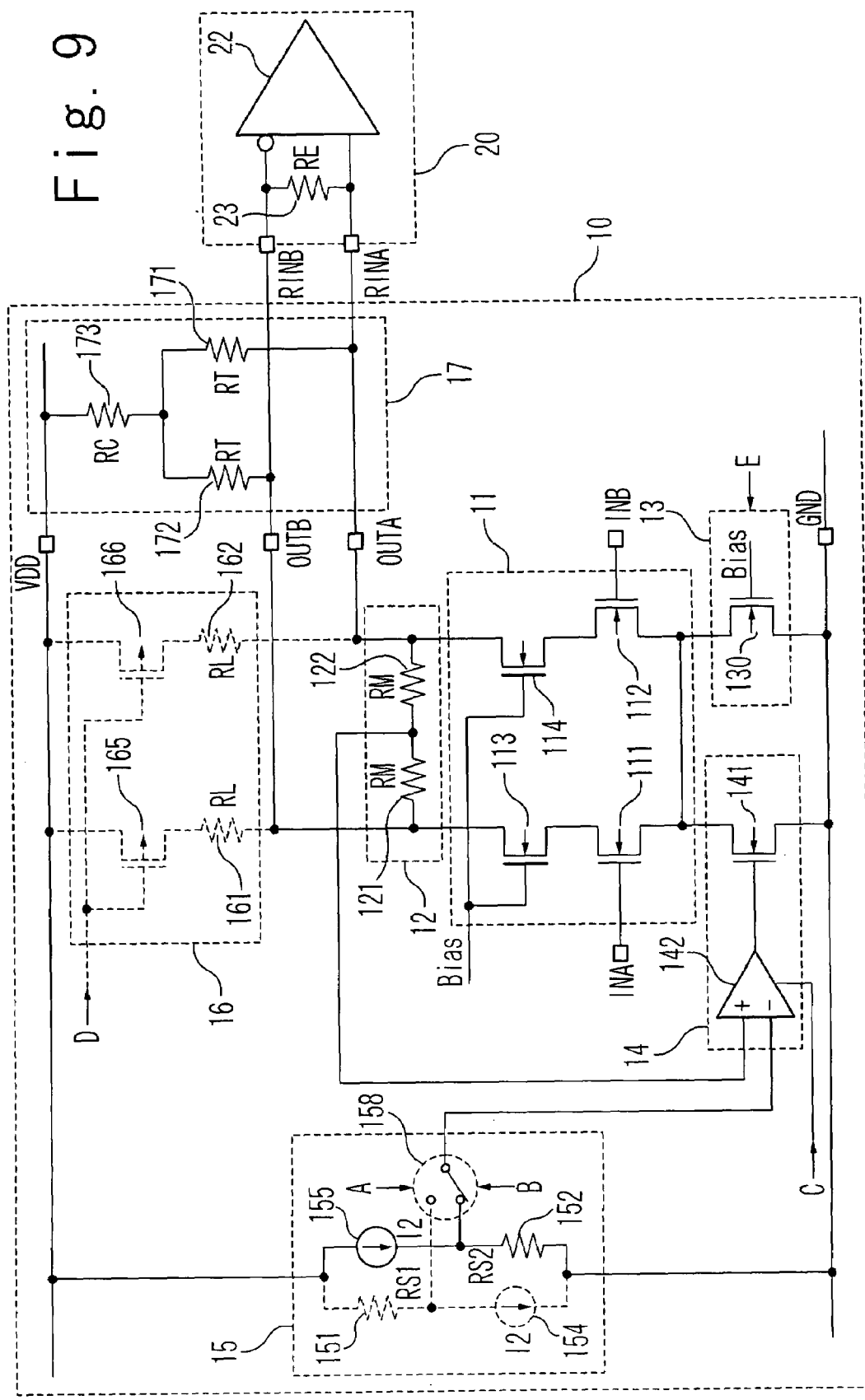
FIG. 9 is a circuit diagram showing an operation of the output circuit (LVDS) according to the embodiment of the present invention.

Next, a case where the output circuit 10 outputs a signal of the LVDS interface will be described referring to FIG. 9. The voltage signals are applied to the external terminals S1 to S3 of the output circuit 10 to select the LVDS interface. As shown in FIG. 9, a circuit section unrelated to the operations of the output circuit of the LVDS interface is represented by broken lines (the control circuit 19 and the external terminals S1 to S3 are not shown).

The control circuit 19 sets the internal resistance section 16 to an opened state and uses the external resistance section 17 as the load resistance. Furthermore, the control circuit 19 controls the switch circuit 158 of the level generating section 15 to select a voltage of a connection node of the resistance 155 and the current source 152 and supplies the voltage to the current correcting section 14. That is, the level generating section 15 generates a voltage higher than the ground GND indicating the output level of the LVDS interface by a predetermined voltage and outputs the generated voltage. The output levels of the LVDS interface outputted from the output terminals OUTA and OUTB are adjusted by use of the resistance 173. In this circuit, the resistance value RC of the resistance 173 is calculated according to the following equation (5-1)

$$RC=RT \times RE \times (VDD-VCM-VOD)/\{(2\times RT+RE)\times VOD\} \quad (5\text{-}1)$$

Thus, by substituting center values of VCM and VOD of the LVDS interface standard for the voltages VCM and VOD and then substituting a center value of a power supply voltage applied to the output circuit 10 as the power supply voltage VDD in the equation (5-1), the resistance value RC can be obtained. The center value of the resistance used for impedance matching is substituted for the resistance value RT and the resistance value RE. Given that the current source section flows the current having the current value I, the amplitude VOD and the common voltage VCM are calculated according to the following equations (5-2) and (5-3).

$$VOD=I\times RT\times RE/(2\times RT+RE) \quad (5\text{-}2)$$

$$VCM=VDD-\{RL\times RL/(2RL+RE)+RD\}\times I \quad (5\text{-}3)$$

As understood by the above-mentioned equations, since the reference current source section 13 supplies a current of a fixed value, the amplitude VOD and the common voltage VCM can be controlled to correspond to the center value generated by the level generating section 15 by controlling the value of the current supplied from the current source section by the current correcting section 14. In other words, the current correcting section 14 corrects the current flowing from the current source section by the N channel transistor 141 so that a voltage value detected by the level detecting section 12, that is, a voltage value at the connection node of the resistance 121 and the resistance 122 is equal to the voltage value outputted by the level generating section 15. Thereby, the common voltage VCM and the amplitude VOD become equal to a signal level of the LVDS interface on the basis of the reference level generated by the level generating section 15. Thus, through the above-mentioned setting and correcting operation of the resistance value and the voltage value, the output circuit 10 can output the signal of the output level of the LVDS interface.

It should be noted that the resistance value RC of the resistance 173 is preferably set to 130 ohm for satisfying the output level of the LVDS interface in FIG. 4 in the configuration of the output circuit 10. This resistance value is a resistance value designated for generally used E24 system.

Figure 10:
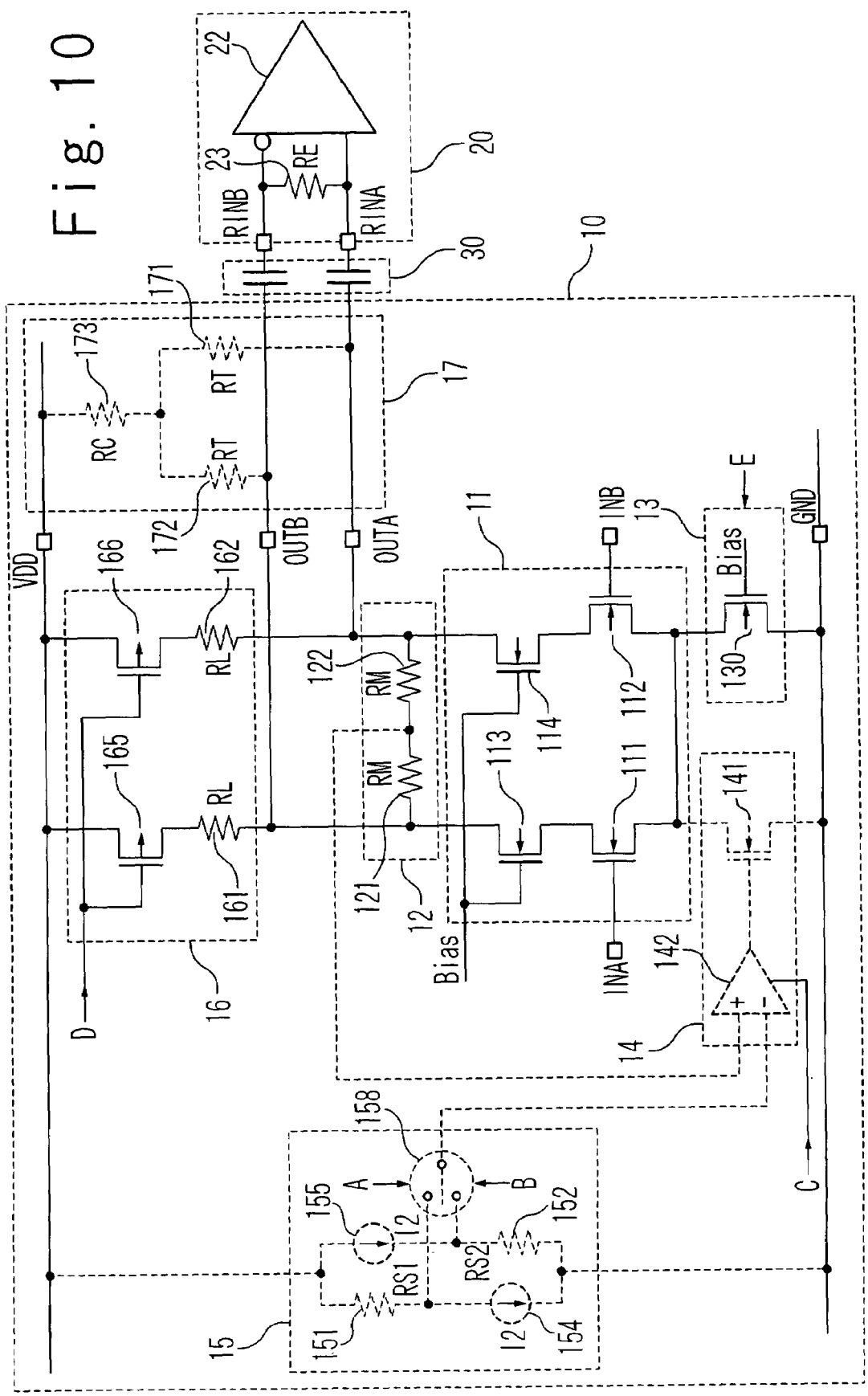
FIG. 10 is a circuit diagram showing an operation of the output circuit (AC-coupled IF) according to the embodiment of the present invention.

Next, a case where the output circuit 10 outputs a signal of the AC-coupled interface such as XAUI will be described referring to FIG. 10. Here, the PCI-express interface is exemplified. The voltage signals are applied to the external terminals S1 to S3 of the output circuit 10 to select the PCI-express interface. As shown in FIG. 10, a circuit portion unrelated to the operation of the output circuit for the PCI-express interface is represented by broken lines (the control circuit 19 and the external terminals S1 to S3 are not shown).

Because of the AC-coupled interface, the receiving section 20 is connected to the output circuit 10 through an AC connecting section 30 having capacitors. In case of the AC-coupled interface, only the amplitude standard needs to be satisfied. Thus, the control circuit 19 disables the level generating section 15 and the current correcting section 14 and only the reference current source section 13 of the current source section is operated. As the load resistance, the internal resistance section 16 is used without using the external resistance section 17. When the AC connecting section 30 has enough capacitance, the amplitude VOD can be calculated according to the following equation.

$$VOD=I\times RL\times RE/(2\times RL+RE) \quad (6\text{-}1)$$

The current value I of the reference current source section 13 and the resistance value RL of the internal resistance section 16 may be set so that the amplitude VOD satisfies the amplitude standard of the PCI-express interface. Through the above-mentioned setting, the output circuit 10 can output a signal of the PCI-express interface.

As described above, comparing comparability of the output circuit 10 to the three kinds of typical interface standards with that of the conventional output circuit, the capability of the output circuit 10 is superior to that of the conventional output circuit in all interface standards. In the present embodiment, the three kinds of typical interfaces have been described. However, the output circuit of the present invention can be also applied to the other balanced transmission interfaces.

Since the current source section controls the current flowing through the resistance connected for adjustment of matching level of the output circuit, the output circuit can satisfy various interface standards. Furthermore, since the resistance value of the level adjusting resistance can be calculated from the signal level of each interface standard, the termination resistance of the input/output circuit and the center values of the power supply voltage and an output level are controlled to correspond to the center values, the output circuit can satisfy various interface standards. That is, the output circuit 10 can output signals corresponding to the DC-coupled interface such as PECL and LVDS and the AC-coupled interface such as PCI-express. In case of the PECL interface and the LVDS interface, an output signal of desired interface level can be outputted without changing configuration of the external resistance section 17 merely by adjusting the resistance value of the level adjusting resistance 173. That is, resistance values of the impedance matching resistances (resistances 171 and 172) are not changed.

In the present embodiment, the output circuit 10 includes the external resistance section 17. This is because the above-mentioned interfaces have relatively strict standard for the resistance value of the impedance matching resistance. If an element which can satisfy the standards can be manufactured, the resistance section may be provided internally, not externally. In the present embodiment, although the output circuit 10 is composed of the N channel transistors in the sections other than the internal resistance section 16, when the polarity of the current source is reversed, the output circuit 10 may be comprised of P channel transistors.

As described above, according to the present invention, the output circuit can transmit the signal of an integrated circuit to which the output circuit belongs to the other integrated circuit. In this case, the output circuit can output signals of matched different interface levels by using the known value of the load resistance provided internally or externally to control the current flowing through the load resistance. Here, the interface level conforming to each standard can be outputted in the interfaces having different output levels which are generally used in ASSP (Application Specific Standard Product) of the optical transmitter module as well as high-speed serial interfaces such as PCI-express and XAUI newly used recently.

Although the present invention has been described above in connection with several embodiments thereof, it will be apparent to those skilled in the art that those embodiments are provided solely for illustrating the present invention, and should not be relied upon to construe the appended claims in a limiting sense.

What is claimed is:

1. An output circuit, comprising:
   a differential section configured to amplify an inputted differential signal;
   a current source section configured to supply a current to said differential section;
   a load resistance section connected with said differential section; and
   a control unit configured to set a value of the current from said current source section and a resistance value of said load resistance section based on a signal,
   wherein said output circuit converts said differential signal into an output signal of a different interface level from that of said differential signal and balance-transmits said output signal,
   wherein said load resistance section comprises a first resistance section and a second resistance section, and said control unit sets whether or not said first resistance section is to be used and whether or not said second resistance section is to be used,
   wherein said second resistance section comprises:
      two external resistances connected in series between said two output terminals; and
      an external adjustment resistance connected between said power supply and a connection node of said internal resistances.

2. The output circuit according to claim 1, wherein when a resistance value of each of external resistances is RT, a resistance value of a termination resistance of a receiving circuit is RE, a power supply voltage is VDD, an amplitude of said output signal is VOD, and a common voltage of said output signal is VCM, a resistance value RC of said external adjustment resistance is calculated from the following equation:

$$RC = RT \times RE \times (VDD - VCM - VOD) / \{(2 \times RT + RE) \times VOD\}.$$

* * * * *